United States Patent [11] 3,617,312

| [72] | Inventor | Henry J. Rose, Danville, Ill. |
|---|---|---|
| [21] | Appl. No. | 745,670 |
| [22] | Filed | July 18, 1968 |
| [45] | Patented | Nov. 2, 1971 |
| [73] | Assignee | Tee-Pak, Inc. Chicago, Ill. |

[54] ANTIMYCOTIC OVERCOATING TREATMENT OF CELLULOSE SAUSAGE CASING
2 Claims, No Drawings

[52] U.S. Cl. ........................ 99/176, 117/145
[51] Int. Cl. ........................ A22c 13/00
[50] Field of Search ........................ 99/174, 176, 171, 171 CA, 75; 106/15; 117/145

[56] References Cited
UNITED STATES PATENTS

| 2,279,788 | 4/1942 | Jebens | 99/171 X |
| 2,476,235 | 7/1949 | Benignus | 106/15 X |
| 2,567,010 | 9/1951 | Coleman | 99/171 X |
| 3,134,687 | 5/1964 | Luck | 106/15 X |
| 2,979,410 | 4/1961 | Parlour | 99/171 |
| 3,427,169 | 2/1969 | Rose et al. | 99/176 |

FOREIGN PATENTS

| 397,390 | 8/1933 | Great Britain | 99/176 |
| 669,919 | 9/1963 | Great Britain | 99/171 |
| 178,533 | 10/1953 | Austria | 99/176 |

*Primary Examiner*—Frank W. Lutter
*Assistant Examiner*—Robert Halper
*Attorney*—Neal J. Mosely ABSTRACT: Cellulose sausage casings are protected against fungus growth by overcoating with a partially water-swellable, water-insoluble, water- and gas-permeable coating composition containing an antimycotic agent which will leach slowly from the coating under conditions of use. Preferred coating compositions comprise a long-chain polyester and a polyacrylic acid emulsion, and an antimycotic agent such as potassium, sodium, or calcium sorbate or propionate, or sorbic or propionic acid, or the lower alkyl esters of parahydroxybenzoic acid, and form a water-insoluble, partially water-swellable, water- and gas-permeable coating upon curing.

ANTIMYCOTIC OVERCOATING TREATMENT OF CELLULOSE SAUSAGE CASING

BACKGROUND OF THE INVENTION

This invention relates to the manufacture of fungus-resistant cellulose sausage casing for use in the production of cooked, smoked, dry or semidry sausages.

In the handling and processing of cellulose sausage casings, one of the problems encountered is the control or inhibition of fungus growth. Spores of fungi cannot germinate without moisture and the development of fungus growth on cellulose can be controlled by keeping the moisture content below a predetermined level. In some cases, however, proper moisture control cannot be maintained and the formation of mold, yeast or other fungus growth may be an important but sporadic problem. In cases where fungus growth growth cannot be controlled by proper control of the moisture content, it is necessary to provide a chemical means to inhibit fungi.

To induce mold or other fungus growth, two factors are necessary, viz, contamination and the presence of proper conditions for continued growth of that contamination. If one fails to limit mold or other fungus growth on cellulose casings by physiochemical means, the second factor becomes important. Spores of fungi cannot germinate without moisture. Cellulose casing has a critical moisture point for prevention of fungus growth. Above this moisture point or level, the moisture level of the casing enhances growth and spread of mold, yeast or other fungi over the surface of the contaminated casing. The problem of fungus growth on casings is encountered in the preparation of sausages of all types, e.g., cooked, smoked, dry and semidry sausages.

In the preparation of cooked sausages, the casing is stuffed with sausage emulsion and then cooked. In the preparation of smoked sausages, the casings are smoked instead of or in addition to cooking. In the case of either cooked or smoked sausages, the problem of fungus growth may be encountered during storage after sausage processing. However, the problem of fungus growth and spread is of a somewhat different nature and particularly acute when the cellulose casing is used for the manufacture of dry (including semidry) sausages.

Dry sausage, of which salami and cervelats are prime examples, is conventionally processed by drying rather than by cooking, hence the name. The preparation of dry sausage involves firmly packing the chill cured meat emulsion into cellulose casings of suitable size and shape, and tying the ends of the casing ready for delivery to the drying room or smokehouse, dependent upon the type of sausage. A smoked dry sausage is first smoked and then dried, while unsmoked dry sausage is dried only. In some meat-packing establishments, the stuffed sausage is first 90 in a green sausage-hanging room and then in the final drying room where it is dried. The drying or curing time will vary with the particular type of sausage being processed and to some extent with the processing conditions. However, 60 to 90 days is usually considered a minimum time and periods of 120 to 180 days or more are used under some circumstances for certain sausage types. During this period of cure and beyond the stuffed dry sausage is particularly susceptible to fungus growth.

The processing of dry sausage is described fully in "Sausage and Ready-to-Serve Meats," published by the American Meat Institute. The term "dry sausage" as used herein includes the entire range of dry and semidry sausages. The semidry sausages include the Thuringer cervelats which are dried for about 10 days (other semidry sausages may be dried in as short a time as 2 to 6 days). Dry sausage is usually sold in three different forms; first, new sausage or semidry sausage, about 10 to 25 days after smoking (having about 20 percent shrinkage); second, medium dry sausage, about 30 to 60 days after smoking (having about 32 percent shrinkage); and dry sausage, about 60 to 90 days or more after smoking (having about 40 percent shrinkage).

As meats will mold under almost any conditions, mold may appear on the sausage casing to some extent in the drying room. This mold may be held at a minimum by washing the sausage and removing the mold spores practically as fast as they develop. The removal of surface mold by washing the casing is at a substantial cost, nor is it entirely effective; thus, the mold has already had a chance to attack the cellulose and the printing, and removal of the mold tends to remove ink from the casing surface. Undesirable mold growth can also occur on the dry sausage after packaging for shipment.

The antimycotic treatment of cellulose sausage casings, whether for cooked, smoked, dry, or semidry sausages, has presented problems resulting from the composition of such casings and the method of use of the casings. The high water and glycerin composition in clear cellulose and fibrous (paper-reinforced) casings, both dyed and undyed, has made the antimycotic treatment of such casings somewhat difficult. Common antimycotics, both of the oil-soluble and water-soluble types, often do not adhere well and tend to leach out excessively in the presoaking of the casing in preparation for stuffing.

Attempts to incorporate antimycotics such as sorbic acid and its derivatives (e.g., potassium sorbate and calcium sorbate) as viscose additives have been unsuccessful because the sorbic acid or its derivatives are either water-soluble per se or are converted to water-soluble products by the viscose alkali and are washed out rather completely during subsequent processing steps. Furthermore, simply adding such materials to the final plasticizing bath of the viscose process and drying will incorporate a degree of fungus resistance to large cellulose casings during storage, but such antimycotics will be removed during the soaking cycle which always precedes the stuffing operation and thus will not provide any functional antimycotic value on the stuffed product. By the method of this invention, an antimycotic agent is added to the casing in a way which insures that it will be lost only by slow leaching to extend its effectiveness over the period of cure and beyond.

STATEMENT OF OBJECTS AND FEATURES

It is an object of this invention to provide a long-lasting antimycotic treatment for cellulose sausage casing.

It is another object of this invention to incorporate nontoxic antimycotic additives onto cellulose sausage casing to achieve a long-lasting antimycotic activity during long periods of sausage processing.

Still another object of this invention is to provide a cellulose sausage casing having a nontoxic antimycotic additive incorporated thereon.

A feature of this invention is a method for the incorporation of an antimycotic chemical additive onto cellulose sausage casing by overcoating with an emulsion (or solution) containing a film-forming material and an antimycotic which is applied to cellulose casing and then cured to make a water-insoluble, partially water-swellable, water- and gas-permeable coating.

Another feature of this invention is the provision of a coating composition comprising an antimycotic emulsified (or dissolved) in a film-forming material which is applied to cellulose casing and cured to make a water-insoluble, partially water-swellable, water- and gas-permeable coating.

Still another feature of this invention is a cellulose sausage casing produced in accordance with the method of this invention having an antimycotic included in a water-insoluble, partially water-swellable, water- and gas-permeable overcoating to give a slow-leaching, long-lasting effect.

These and other objects and features of this invention will become more readily apparent throughout the specification and claims as hereinafter related.

SUMMARY OF THE INVENTION

In accordance with this invention, it has been discovered that cellulose sausage casings may be rendered resistant to fungus growth by application of a coating containing an antimycotic and which when fully cured is water-insoluble, partially water-swellable, and water- and gas-permeable. A suitable coating composition comprises a solution or emulsion of an antimycotic, such as sorbic acid or propionic acid or sodium, potassium or calcium salts thereof, or lower alkyl esters of parahydroxybenzoic acid, together with a long-chain polyester and polyacrylic acid (alkali metal salt) in water. Another suitable composition comprises an aqueous suspension or solution of a polyfunctional water-soluble polymer, a polyfunctional cross-linking agent, and an antimycotic. Either composition, when applied to a cellulose casing and dried, yields a coating which is adherent, water-insoluble, partially water-swellable, and permeable to gas and water vapor.

DESCRIPTION OF THE PREFERRED EMBODIMENTS

This invention achieves an antimycotic chemical treatment of cellulose sausage casing, in a way which insures that the antimycotic will remain with the casing throughout the processing and handling thereof. An antimycotic such as potassium, sodium or calcium propionate or sorbate or sorbic or propionic acid, or the lower alkyl esters of parahydrobenzoic acid (e.g., methyl-, ethyl-, or propyl-parahydroxybenzoate) is dissolved or emulsified in a liquid, film-forming coating material such as a long-chain polyester and polyacrylic acid (alkali metal salt) emulsion, overcoating the outer surface of preferably gel (undried) cellulose casing with the coating composition, AND curing the coated casing. If desired, the dried, rather than the undried, casing may be overcoated. The coating composition becomes water-insoluble, partially water-swellable and water- and gas-permeable upon curing, thereby protecting the antimycotic against rapid water leaching to maintain its antimycotic activity during long periods of storage either before or after stuffing with sausage emulsion.

The coating composition can be applied to the outer surface of the casing in any desired manner. Thus, application to conventional regenerated cellulose casing, fibrous casing, or any other kind of casing can be made by coating the outer surface of the tubular (inflated) casing by brushing, spraying or dipping. If desired, flattened casing (reel stock) can be coated. At the time the coating composition is applied in the form of an emulsion or solution which contains the antimycotic, to be converted to a hard film, it must undergo a chemical or physical reaction (curing), which converts it from a mobile liquid into a hard, gellike structure. The curing of the coating is preferably through evaporation and heating for a short time to form a water-insoluble film and is preferably accomplished during the drying of coated gel casing. In the curing step, the antimycotic is fixed within the casing and the coating.

The drying time and temperature are interdependent factors insofar as effecting the drying of the casing and the nature of the resulting film are concerned, as will be apparent to those skilled in the art. Various combinations of time and temperature can be used, provided, of course, that the temperature is not so high and the time not so long that the casing itself or the coating film is injured.

COATING COMPOSITION

The coating composition used in treating clear or fibrous cellulosic casing is prepared by forming a solution or emulsion containing the desired antimycotic and the polymeric coating ingredients which produce the desired water-insoluble partially water-swellable, permeable coating. The coating composition contains 0.1–5.0 percent wt. (preferably about 1 percent) of the antimycotic. In normal application of the coating there is applied about 200 mg. of antimycotic per sq. cm. of casing treated. The minimum effective concentration of antimycotic in the casing is about 100–200 p.p.m. while the upper limit is determined mainly be economic considerations.

The coating composition includes a polymeric, at least partly organic, fluid, film-forming coating material which solidifies after having been spread out in a thin layer to form a thin, coherent, adherent, water-insoluble partially water-swellable, water- and gas-permeable, water-resistant film or layer of a satisfactory rigidity, porosity, and toughness. The preferred polymeric material includes a long-chain polyester and polyacrylic acid emulsion. The long-chain polyester is preferably a polymeric ester of polybasic acids and polyols. If an alkyd-type polyester is employed, it should be oil modified. See, for example, U.S. Pat. No. 3,379,548.

Other polymers may be suitably employed together with the long-chain polyester and/or polyacrylic acid which, if used alone to coat cellulose sausage casings, may tend to hinder water vapor transmission which is required in sausage casings. Such polymers include the copolymers of vinylidene chloride with a comonomer such as acrylamide, vinyl acetate or vinyl chloride, polyvinyl-ethylene, polyvinyl acetate based copolymers various acetoxylated polyoxyethylene latex systems, certain natural resins, acrylic resins such as polyacrylates and polymethacrylates, polyethylenes, or urea-formaldehyde resins.

An alternate coating composition may include instead a water-soluble polymer having at least two reactive functional groups therein (e.g., gelatin, gum arabic, gum tragacanth, or egg albumin) and a difunctional or polyfunctional cross-linking agent e.g., diisocyanates, dialdehydes, aldehydes, polyepoxides, etc.) together with the desired antimycotic. Cure is effected by heating and drying the coating on the cellulose tubing to cross-link and insolubilize the same. The polymer and cross-linking agent in the coating composition must be compatible i.e., not reactive with water or with each other at ambient temperatures.

Water-soluble, polyfunctional, polymeric organic materials which are used in aqueous solution for coating cellulosic casings or other cellulosic substrates include a variety of materials such as gelatin, egg albumin, natural gums, such as gum tragacanth or gum arabic, starch derivatives, soluble cellulose ethers such as methyl cellulose, hydroxyethyl cellulose, carboxymethyl cellulose, etc. Gelatin, however, is the preferred polymer because of its low cost, high viscosity and adaptability to printing.

The cross-linking agents which are applied to insolubilize the polyfunctional, polymeric coating materials include a variety of cross-linking agents having two or more reactive functional groups per molecule, such as isocyanate, isothiocyanate, epoxy, chloroepoxy, acyl halide, acyl amide, ester, ketene, imino, halogen, or acid anhydride groups (including compounds having mixtures of such functional groups). Typical compounds which may be used as cross-linking agents include, but are not limited to, the following:

Diisocyanates—The diisocyanate of dimer acid, 4,4'-methylene bis(cyclohexyl isocyanate)

Diisothiocyanates—The diisothiocyanate of dimer acid, 4,4'-methylene bis(cyclohexyl isothiocyanate)

Polyepoxides—butadiene diepoxide

Chloroepoxides—The reaction product of epichlorohydrin and a polyamide

Acyl halides—adipyl chloride, sebacyl chloride

Acyl amides—adipyl amide, sebacyl amide

Polyesters—dimethyl sebacate, dimethyl suberate

Polymeric ketenes—dimeric acid diketene

Polyhalides—1,6–dichlorohexane

Di-imides—1,6–diimidohexane

Polyfunctional nitriles—1,6–dicyanohexane, tetracyanoethylene

Polyfunctional acid anhydrides—pyromellitic acid anhydride

Dialdehydes—glyoxal, malonaldehyde, glutaraldehyde, dialdehyde starch

Aldehydes—formaldehyde

In applying the cross-linking agents to the various coating materials, the less reactive cross-linking agents are applied in admixture with the polymeric, polyfunctional coating material and antimycotic in aqueous solution. After the cellulosic substrate is coated with the solution, the drying of the product is effective to cause the cross-linking agent to react with and cross-link and insolubilize the water-soluble, polyfunctional material and, in some cases, cross-links the coating to the substrate. When the water-soluble, polyfunctional material and cross-linking agent are used together in aqueous solution, it is necessary to select compatible materials, i.e., polyfunctional polymers and cross-linking agents which are not reactive with each other or with water at ambient temperatures. Where more reactive cross-linking agents are used, the cellulosic substrate or casing may first be passed through an aqueous solution of the water-soluble, polyfunctional, polymeric coating material and antimycotic and then cross-linked in a separate treating step.

Having generally described the invention, the following examples are included for purposes of illustration so that the invention may be more readily understood and are in no way intended to limit the scope of the invention unless otherwise specifically indicated. All percentages or proportions are on a weight basis unless otherwise specified.

EXAMPLE 1

In this example, the use of a polyester emulsion as the film-forming material is illustrated in treating a casing for use in dry sausage manufacture.

A fibrous casing is continuously prepared and colored a light cream or white opaque by pigment injection with a titanium dioxide opacifier. Undyed, unpigmented, large size fibrous casings are also prepared.

The inside of the casings are treated with a mixture of a soluble protein, such as gelatin, and a liquid smoke, in solution, to produce a coating thereon which is effective in causing the casing to adhere to dry sausage emulsion and follow the shrinkage of the sausage during curing. See U.S. Pat. No. 3,360,383. If desired, the inside of the casings may be coated instead with a mixture of gelatin and glutaraldehyde. See U.S. Pat. No. 3,383,223. Alternatively, the inside of the casings may be coated with a mixture of gelatin and piperazine. See U.S. Pat. No. 3,367,786.

The casings are then coated on the outside with a film-forming emulsion prior to drying. In successive experiments, each of the following film-forming polyester emulsions (see table I) is prepared and applied to each type of casing by passing the gel casing through the emulsion (dip coating). To form the emulsion, the ingredients are stirred in the order indicated. The ingredients are expressed in grams per 1,000 grams of emulsion.

TABLE I.—POLYESTER COATING EMULSIONS

| Emulsion number | 1 | 2 | 3 | 4 | 5 |
|---|---|---|---|---|---|
| DDI 1410 | 4.0 | 1.0 |  | 4.0 |  |
| 20% ASE-95 | 4.0 | 4.0 | 5 | 4.0 | 20 |
| .2% NaOH | 33 | 33 | 33 | 100 | 130 |
| 20% Marlon 403 | 100 | 100 | 80 | 100 | 100 |
| Paraplex G62 |  |  |  |  | 30 |
| .1% NaOH | 120 | 200 | 160 |  | 730 |
| Potassium sorbate | 10 | 10 | 10 | 10 | 10 |
| Glycerol | 80 | 80 | 80 | 80 | 80 |
| 50% QX2139 |  |  |  | 40 |  |
| 61% Polidene 930 |  |  |  |  | 65 |
| pH | 7.0 | 7.6 | 6.3 | 7.1 | 6.9 |

Waters to total 1,000 each.

DDI 1410 is a trademark of General Mills for a water-stable, long-chain, aliphatic diisocyanate synthesized from dimer acid. Functionally, it reduces or even reverses the coating tendency to leaching by water.

ASE-95 is a trademark of Rohm and Haas for a 20% emulsion of polyacrylic acid. Specifically, it is an acid-containing, acrylic emulsion copolymer. It functions as a thickener, suspending agent, emulsifier and emulsion stabilizer. Furthermore, it contributes water-swellability and permeability properties to the cured water-insoluble film. As such, it must be present in much lesser quantities in the emulsion than the polyester.

Marlon 403 is a trademark of the Marlon Company for 20% polyester solution in methyl ethyl ketone. The polyester is a long-chain interaction product of dibasic acids and dibasic alcohols, including phthalic, terephthalic, isophthalic acids, maleic anhydride, with combinations of the various glycols.

Paraplex 662 is a trademark of Rohm and Haas for a polyester which is an epoxidized soybean derivative.

QX2139 is a trademark of Dow for a vinylidene chloride copolymer emulsion.

Polidene 930 is a trademark of A. E. Staley Company for a vinylidene chloride copolymer emulsion.

If desired, sodium or calcium sorbate can be substituted for potassium sorbate in any of the above emulsions.

The casings are dried in a conventional casing drier which not only dries the casing but also cures the coating to form a water-insoluble film. The casing is wound on a reel as a flattened tube. Casing reel-stock is usually cut to order and imprinted (and air dried) for the customer (meat packer).

The adherence of the coating to the casing is tested by applying ink lines from a felt marker pen to the coated casing and then testing for removal of the inked lines under conditions of rubbing or stripping an adhesive tape from the surface thereof. A soft paper is rubbed vigorously against the marked surface under both wet and dry conditions. If the inked lines are not removed, it is considered good proof that the coating is not removed. Also, the coating is tested by applying a pressure sensitive tape (Scotch tape) over the inked surface and then quickly stripping the tape from the surface. If the tape does not remove the inked lines, it is considered proof of good adhesion of the coating to the casing. In subsequent examples, these tests are referred to as the paper-rub and Scotch tape tests for adherence of coatings to the casing.

A complete testing of coating adhesion involves testing the casing in a dry, flat state, also after a hot or cold water presoak in preparation for stuffing, and in a fully stuffed condition after processing through hot water and/or cold water. If the coating adheres properly after stuffing and hot and cold water processing of the sausage, it is considered satisfactory.

The casings coated as described above are presoaked in hot water according to standard commercial practice and then stuffed with a dry sausage emulsion of the cervelat and also of the Italian dry salami type. The stuffed casings are cured over a period of 40—120 days. Over this extended period of time, there is a very substantial shrinkage of the sausage as the sausage emulsion is cured, and in each case the casing adheres to and follows the shrinkage of the sausage so that there is no separation of the casing from the sausage. In each experiment, a similar nontreated fibrous casing is run as a control. The casings coated in accordance with this invention exhibit no fungus growth while the untreated controls exhibit substantial fungus growth thereon during curing.

Furthermore, coating adhesion to all the stuffed treated casings after hot and cold water processing is highly satisfactory, as determined by paper-rub and Scotch tape removal of imprinted inks from the stuffed casings. The coatings which are applied onto the outside of the casings do not adversely affect the desirable permeability characteristics of the casing with respect to moisture vapor, smoke, printing and the like. These coatings are also suitable for printing ink retention on the coated surface.

EXAMPLE 2

In this example, orange-dyed fibrous casing treated on the inside with gelatin/liquid smoke is coated on the outside, in successive experiments, with each of the following miscellaneous emulsions listed in table II. The emulsion is applied by dip coating the casing prior to drying. To form the emulsion, the ingredients are stirred in the order indicated. The ingredients are expressed in grams per 1,000 grams of emulsion.

TABLE II.—COATING EMULSIONS

| Emulsion number | 6 | 7 | 8 | 9 | 10 | 11 | 12 |
|---|---|---|---|---|---|---|---|
| .2% NaOH | 230 | 100 | 100 | 250 | 250 | 180 | 100 |
| 20% ASE-95 | 5.0 | 5.0 | 5.0 | 5.0 | 5.0 | 5.0 | 5.0 |
| DDI 1410 | 10 |  |  |  |  |  |  |
| 61% Polidene 930 |  | 65 | 65 |  |  |  | 10 |
| 50% QX2139 |  |  |  |  |  | 80 |  |
| 57% QX3755 | 90 |  |  | 80 | 80 |  |  |
| PVPK60 |  |  | 5 |  | 5 |  | 5 |
| Propionic acid | 10 | 10 | 10 | 10 | 10 | 10 | 10 |
| Glycerol | 80 | 80 | 80 | 80 | 80 | 80 | 80 |

Waters to total 1000 each.

QX3755 is a trademark of Dow for a vinylidene chloride copolymer emulsion.

PVPK60 is a trademark of General Aniline and Film Company for polyvinyl pyrollidone.

The casing is then cured by heating for a short time to form a water-insoluble film. The casing is then imprinted and air dried.

If desired, sorbic acid or potassium sorbate can be substituted for propionic acid in any of the above emulsions. Furthermore, the methyl, ethyl or propyl esters of parahydroxybenzoic acid may also be employed in lieu of or in addition to any of these antimycotics.

The casings coated with the above emulsions are presoaked in hot water and stuffed with dry sausage emulsions of the various salami types. The stuffed casings are cured over a period of 60–120 days. In each experiment a nontreated, fibrous casing is run as a control. The casings coated in accordance with this invention exhibit no fungus growth while the untreated controls exhibit substantial fungus growth thereon during curing.

Coating adhesion to all of the stuffed treated casings after hot and cold water processing is highly satisfactory, as determined by paper-rub and Scotch tape tests for removal of imprinted inks from the stuffed casings. The coatings which are applied onto the outside of the dyed casings are also suitable for crock (dye rub-off) resistance.

EXAMPLE 3

In this example, the use of a simple polyester emulsion as a film-forming coating material in order to insolubilize an antimycotic therein for use on gel cellulose casing for the processing of bologna sausages is illustrated. This example also illustrates the use of another simple polyester emulsion for use on dried casing.

The following ingredients are stirred into a bath in the order indicated:

```
        20% methyl parahydroxybenzoic acid in
          methyl ethyl ketone
    25 g.
        20% Marlon 403 in methyl ethyl ketone      100 g.
        20% ASF-95 acrylic emulsion                  6 g.
        Glycerol                                    80 g.
        0.2% NaOH                                   40 g.
        Then slowly add 0.2% NaOH
    100 g.
               to pH 6.8
        Add water to total 1,000 g.
```

The emulsion, prepared as above, is used to coat heavy, large diameter, clear gel cellulose casing on the outside to form a coating in order to insolubilize an antimycotic therein. The emulsion, with the glycerol omitted in the emulsion formulation, is also used to coat-dried casing on the outside.

In further experiments, the casings coated as described above are presoaked in hot water and stuffed with a bologna emulsion. A nontreated clear casing is run as a control. The casings coated in accordance with this invention exhibit no fungus growth while the untreated controls exhibit occasional fungus growth thereon. Furthermore, coating adhesion to both of the stuffed treated casings after hot and cold water processing is highly satisfactory, as determined by paper-rub and Scotch tape removal of imprinted inks from the stuffed casings.

EXAMPLE 4

In this example, the use of a water-soluble polymer having at least two reactive functional groups therein and a polyfunctional cross-linking agent as a film-forming coating material is illustrated. Specifically, this example shows the use of a gelatin polymer and a polyepoxide cross-linking agent as the film-forming material. However, as previously discussed, other film-forming water-soluble, polyfunctional, polymeric organic materials and compatible difunctional or polyfunctional cross-linking agents may also be employed to form the coating in order to insolubilize an antimycotic therein.

A coating composition of 0.5 percent Kymene 557 (polyepoxide cross-linking agent), 0.75 percent gelatin, 0.9 percent potassium sorbate and 10 percent glycerol in an aqueous solution is applied by dipping several pieces of pigment-injected and several pieces of dyed fibrous casing (previously treated on the inside with gelatin/liquid smoke) in the coating composition to form a thin layer of film on the outside of the casing. The coated casing is then cured during drying in a conventional casing drier. Kymene 557 is a trade name of Hercules Powder Company for the water-soluble, polymeric polyepoxide which is the reaction product of epichlorohydrin and a polyamide prepared by reacting adipic acid with diethylenetriamine. Kymene 557 is obtained as a pale amber liquid of 10 percent solids content, having a density of 1.026, a viscosity of 30 centipoises at 25° C. (Brookfield), a pH of 5.0, and a nitrogen content (Kjeldahl) of 12.8 percent (dry solids basis).

In further experiments, the casings coated as described above are presoaked in hot water and stuffed with dry sausage emulsions of the cervelat and dry sausage emulsions of the cervelat and dry salami types. The stuffed casings are then cured over a period of 40–120 days. In each experiment, a nontreated fibrous casing is run as a control. The casings coated in accordance with this invention exhibit no fungus growth while untreated controls exhibit some fungus growth thereon during curing.

Coating adhesion to all of the stuffed treated casings after hot and cold water processing is highly satisfactory, as determined by paper-rub and Scotch tape tests for removal of imprinted inks from the stuffed casings. The coatings have a satisfactory gas and water vapor permeability for processing various kinds of sausages. Also, the coated casings are quite receptive to printing inks.

EXAMPLE 5

In this example, the use of a film-forming coating material in order to insolubilize an antimycotic therein for use on clear cellulose casing for the processing of bologna sausages is illustrated.

Heavy, large diameter, clear cellulose casing is coated with a coating composition consisting of an emulsion of 1.0 percent Kymene 557, 1.0 percent gum tragacanth (or gum arabic), 10 percent glycerol and 0.9 sodium sorbate in aqueous solution. The emulsion is applied by dip coating several pieces of the regenerated cellulose casing prior to drying to form a thin layer of film on the casing. The coating casing is then cured during drying in a conventional casing drier.

In further experiments, the casings coated as described above are presoaked in hot water and stuffed with bologna emulsions of various types. In each experiment, a nontreated clear casing is run as a control. The casings coated in accordance with this invention exhibit no fungus growth while the untreated controls exhibit some fungus growth thereon. Furthermore, coating adhesion to all of the stuffed treated casings after hot and cold water processing is highly satisfactory, as determined by paper-rub and Scotch tape removal of imprinted inks from the stuffed casings.

EXAMPLE 6

In this example, the use of a film-forming coating material in order to insolubilize an antimycotic therein for use on fibrous cellulose casing for the processing of bologna sausages is illustrated.

Large diameter, fibrous cellulose casing is coated with a coating composition consisting of an emulsion of 0.75 gelatin, 0.1 percent epichlorohydrin, 10 percent glycerol and 1.0 percent calcium propionate in aqueous solution. The emulsion is applied by dip-coating several pieces of the fibrous cellulose casing prior to drying to form a thin layer of film on the casing. The coated casing is the cured in the casing drier.

In further experiments, the casings coated as described above are presoaked in hot water and stuffed with bologna emulsions of various types. In each experiment, a nontreated clear casing is run as a control. The casings coated in accordance with this invention exhibit no fungus growth while the untreated controls exhibit some fungus growth thereon. Furthermore, coating adhesion to all of the stuffed treated casings after hot and cold water processing is highly satisfactory, as determined by paper-rub and Scotch tape removal of imprinted inks from the stuffed casings.

While this invention has been described with special emphasis upon several preferred embodiments, it should be understood that within the scope of the appended claims the invention may be practiced otherwise than as specifically described herein.

I claim:

1. A regenerated cellulose tubular sausage casing having uniformly coated on the outer surface thereof a coating consisting of a water-insoluble, partially water-swellable and permeable film consisting of a long-chain polyester and polyacrylic acid, said film having uniformly distributed therethrough at least 100 p.p.m., by weight of said casing, of an antimycotic consisting of sorbic acid, potassium sorbate, sodium sorbate, propionic acid, potassium propionate, sodium propionate, methyl parahydroxybenzoate, ethyl parahydroxybenzoate or propyl parahydroxybenzoate, sufficient to inhibit fungus growth thereon.

2. The casing of claim 1 wherein said long-chain polyester is the interaction product of polybasic acids and polyols.

* * * * *